(12) United States Patent
Saen et al.

(10) Patent No.: US 9,144,908 B2
(45) Date of Patent: Sep. 29, 2015

(54) MANIPULATOR DEVICE

(75) Inventors: Makoto Saen, Tokyo (JP); Kiyoto Ito, Tokyo (JP); Yoshimitsu Yanagawa, Tokyo (JP); Tomomi Takahashi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 18 days.

(21) Appl. No.: 14/114,208

(22) PCT Filed: Apr. 18, 2012

(86) PCT No.: PCT/JP2012/060509
§ 371 (c)(1),
(2), (4) Date: Jan. 13, 2014

(87) PCT Pub. No.: WO2012/147595
PCT Pub. Date: Nov. 1, 2012

(65) Prior Publication Data
US 2014/0148951 A1    May 29, 2014

(30) Foreign Application Priority Data

Apr. 27, 2011   (JP) .................................. 2011-099781

(51) Int. Cl.
| B25J 15/00 | (2006.01) |
| B25J 19/00 | (2006.01) |
| B25J 15/08 | (2006.01) |
| B25J 15/02 | (2006.01) |
| B25J 13/08 | (2006.01) |
| G01L 5/22 | (2006.01) |
| B25J 9/16 | (2006.01) |
| G01L 5/00 | (2006.01) |

(52) U.S. Cl.
CPC ............ *B25J 15/0253* (2013.01); *B25J 9/1612* (2013.01); *B25J 13/083* (2013.01); *B25J 13/085* (2013.01); *G01L 5/009* (2013.01); *G01L 5/228* (2013.01); *Y10S 901/32* (2013.01); *Y10S 901/34* (2013.01); *Y10S 901/47* (2013.01)

(58) Field of Classification Search
USPC ............ 700/259, 258, 245; 901/46, 47, 31, 9, 901/30, 32, 33, 36, 38; 294/213; 434/250
See application file for complete search history.

(56) References Cited

U.S. PATENT DOCUMENTS

| 5,486,112 A * | 1/1996 | Troudet et al. ................. 434/250 |
| 2004/0102858 A1 * | 5/2004 | Kesil et al. ........................ 700/11 |
| 2008/0259026 A1 * | 10/2008 | Zeldin et al. ................... 345/157 |
| 2011/0106339 A1 * | 5/2011 | Phillips et al. ..................... 701/2 |
| 2014/0035306 A1 * | 2/2014 | Garcia et al. ................... 294/213 |

FOREIGN PATENT DOCUMENTS

| JP | 2010-201538 A | 9/2010 |
| JP | 02010201538 A * | 9/2010 |

* cited by examiner

*Primary Examiner* — Ronnie Mancho
(74) *Attorney, Agent, or Firm* — Miles & Stockbridge P.C.

(57) ABSTRACT

A manipulator device has an arm portion and a hand portion The hand portion includes one or more finger portions that manipulate a target object. Each finger portion includes a slip sensor and multiple contact sensors, with at least one contact sensor at a position proximate to the slip sensor and at least another contact sensor at a position remote from the slip sensor. When the contact sensors at the positions remote from the slip sensor detect contact of the target object and the contact sensors arranged at the positions proximate to the slip sensors do not detect contact, a position of the finger portion is moved by a distance corresponding to the distance between the contact sensors detecting contact of the target object and the contact sensors arranged at the positions proximate to the slip such that a detecting position of the slip sensor is coincident with a position of the target object.

10 Claims, 7 Drawing Sheets

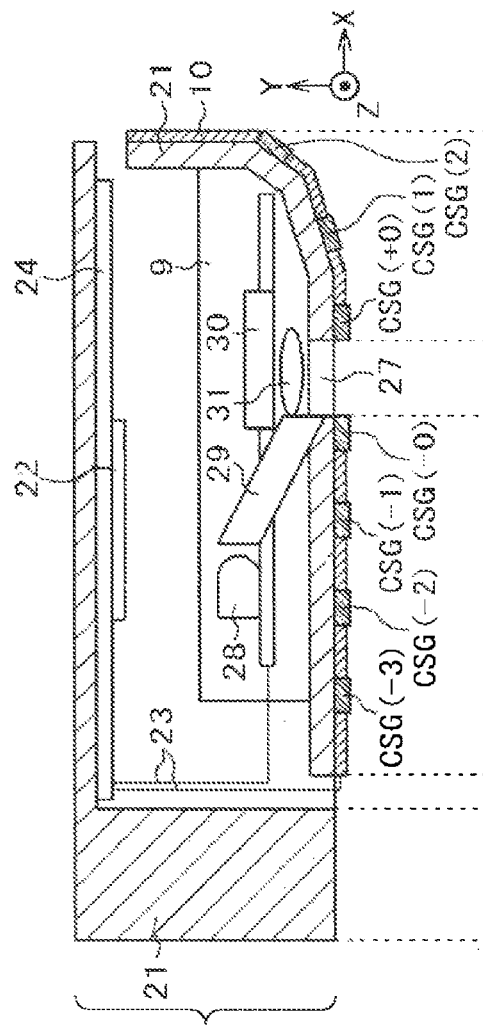
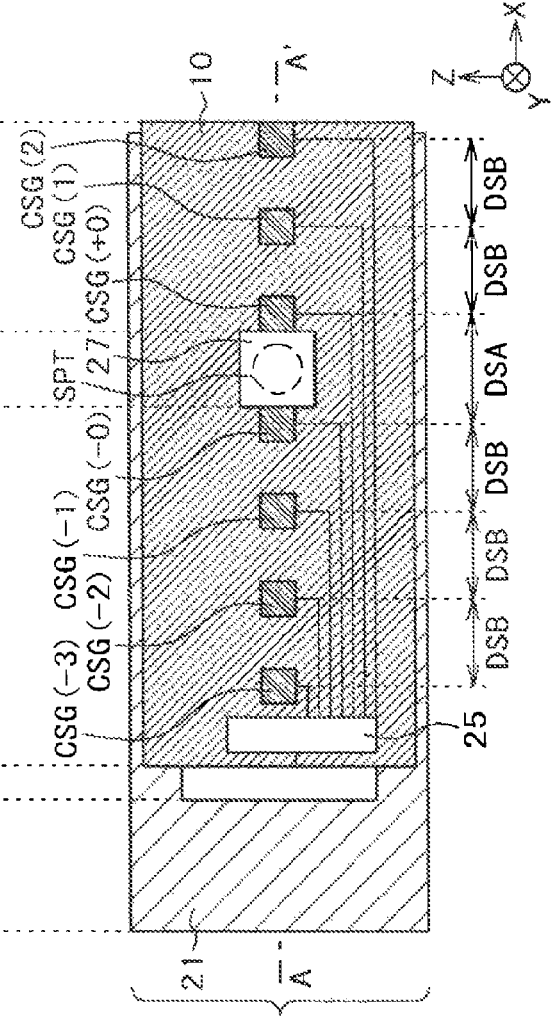

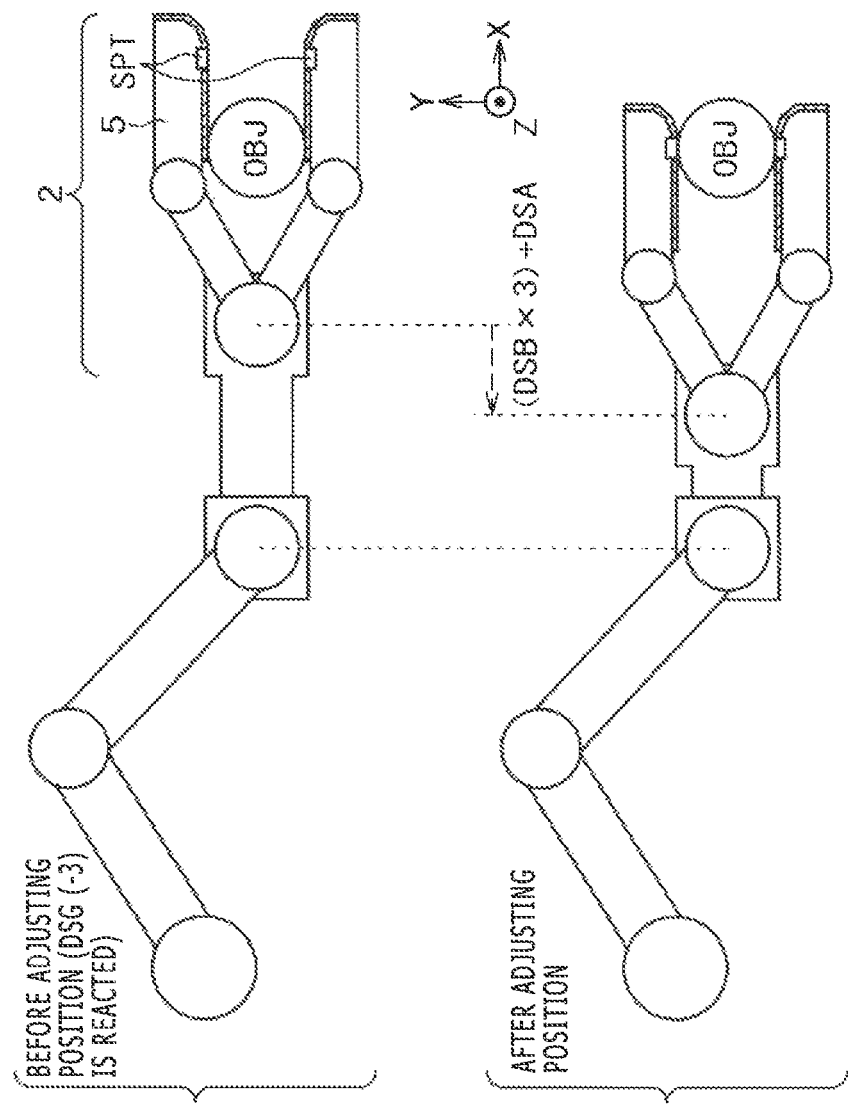

MANIPULATOR DEVICE

BACKGROUND

The present invention relates to a manipulator device, particularly to a manipulator device for use in a living space.

Although manipulators have mainly been utilized in production fields for assembling or the like, manipulators are expected to be utilized for assisting human activities in living spaces of public facilities of hospitals, or households in the future. Various objects having different hardnesses, weights, shapes, sizes and the like need to be handled when manipulators are utilized in living spaces.

For example, a sensor is arranged at a portion of a manipulator in contact with an object and a control is performed by using information from the sensor. A pressure sensor for detecting a pressure generated between an object and a manipulator is an example of a sensor for such a use. However, in a case where objects vary and hardnesses or weights differ, an operation under a constant pressure is not appropriate, and a pressure generated by a manipulator needs to be changed based on the object. When an object is manipulated by a constant force regardless of the target object, the object may be damaged, or the object may slip from the manipulator's grasp. As a means for resolving the problem, a position of the object relative to the manipulator (slip) is detected and a force is controlled based thereon.

Many sensing systems for detecting slip are possible. When a manipulator is utilized in a living space, it is very important to manipulate a light weight object. In such a case, a force applied to the sensor is very small, and therefore, an optical sensor which does not need to be deformed in order to sense is an option.

It is necessary to set a slip detection point for the object to be manipulated in order to effectively operate an optical slip sensor. Japanese Unexamined Patent Application Publication No. 2010-201538 proposes that an optical slip sensor is mounted to a finger of a manipulator, and the manipulator is provided with finger attitude adjusting means and at least two pressure sensitive elements. Thereby, an angle of the finger is controlled optimally for the slip sensor.

SUMMARY

When a manipulator is utilized in a living space, the manipulator needs to manipulate objects having various sizes or shapes. Frequently, an object to be manipulated can not be positioned at a slip detection point of a sensor by merely adjusting an angle of a fingertip, as disclosed in Japanese Unexamined Patent Application Publication No. 2010-201538. For example, in a case where a cylindrical object or an object smaller than the finger is manipulated, there poses a problem that only a narrow portion of the finger is brought into contact with the object. Thus, the slip sensor is not arranged at the contact point, and slip cannot be detected.

An object of the present invention is to enable manipulation of objects of various sizes or shapes by applying a more appropriate force via the manipulator device that grasps the objects.

Representative aspects of the present invention as disclosed in the present application are described below.

A manipulator device of the present invention comprises an arm portion and a hand portion, and the hand portion includes one or more finger portions for manipulating a target object. The one or more finger portions have a slip sensor, one or more contact sensors at a position(s) proximate to the slip sensor, and one or more contact sensors at a position(s) remote from the slip sensor. The manipulator device includes a control unit performing a control of a position of the finger portion. When the one or more contact sensors arranged at the position(s) remote from the slip sensor detect contact of the target object and the one or more contact sensor arranged at the position(s) proximate to the slip sensor do not detect the contact, a position of the finger portion is moved by a distance between the contact sensor that detects the contact of the target object and one of the contact sensors at a position proximate to the slip sensor such that a detecting position of the slip sensor coincides with a position of the target object. Thereby, the position of the finger of the manipulator can be changed such that the object to be manipulated is brought into contact with a slip detection point of the slip sensor.

According to the manipulator device of the present invention, objects of various sizes or shapes can be manipulated by a more appropriate force.

BRIEF DESCRIPTION OF THE DRAWINGS

FIGS. 2A and 2B are views showing a configuration of a fingertip end portion according to the first embodiment of the present invention;

FIGS. 3A and 3B are views showing an outline of position adjustment according to the first embodiment of the present invention;

DETAILED DESCRIPTION

An explanation will be given of embodiments of the present invention in reference to the drawings as follows.

Incidentally, according to the present invention, a slip sensor indicates a means or a device for detecting a change in positions of the sensor and an object relative to each other, for example, an optical slip sensor as shown in the first embodiment, a contact type sensor as shown in the fourth embodiment, a sensor utilizing a piezoelectric element and so on.

First Embodiment

Figure 1:
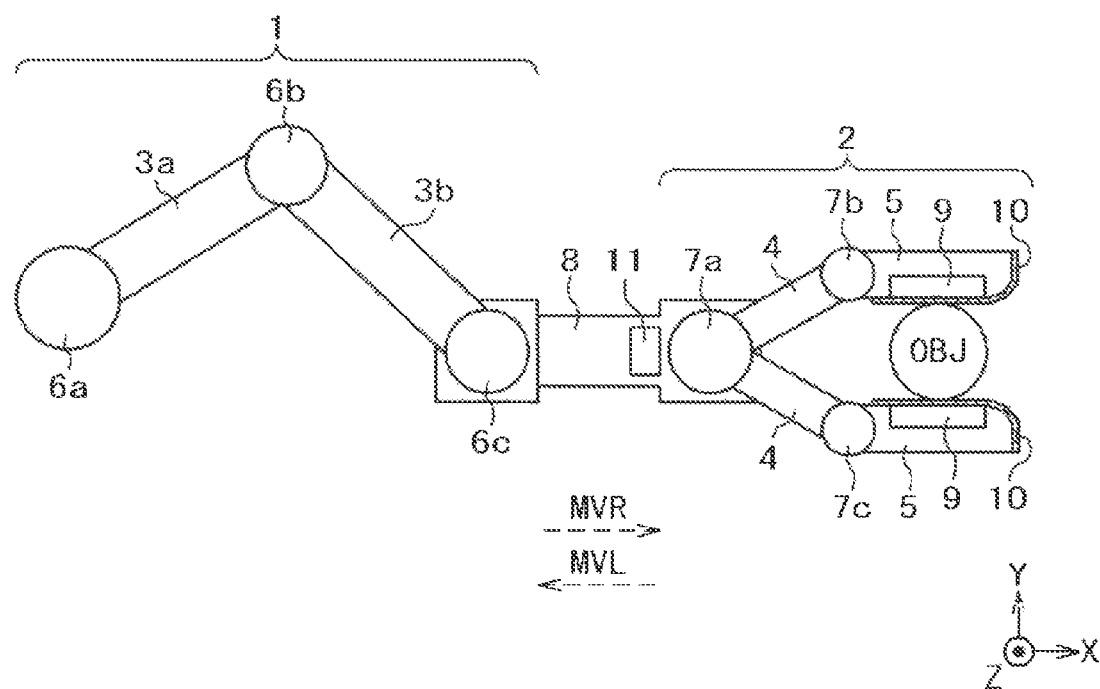
FIG. 1 is a configuration view of a manipulator system according to a first embodiment of the present invention.

FIG. 1 shows one mode of a manipulator according to the first embodiment. In the drawing, for convenience of the explanation, the X axis designates a direction directed from left to right, the Y axis designates a direction from the bottom of the page to the top of the page, and the Z axis designates a direction coming out of the page. A negative direction of the Z axis is in the direction of gravity. In the following drawings of the present application, X, Y, and Z axes are illustrated to conform to FIG. 1.

The manipulator comprises an arm portion 1, a hand portion 2, and a connecting portion connecting these. The arm portion 1 comprises pole portions 3a and 3b, the hand portion 2 comprises finger portions 4 and 5, and the connecting portion of the arm and the hand comprises a slide type joint portion 8. The arm portion 1 and the hand portion 2 are provided with revolute joint portions 6a, 6b, 6c, 7a, 7b, and 7c for performing revolution. The fingertip portion 5 of the hand is provided with a slide sensor module 9, and a contact sensor module 10. The contact sensor is a sensor for detecting contact between an object and the manipulator, for example, using a touch displacement sensor, or by detecting a pressure that corresponds to the contact. The slide type joint portion 8 is provided with a control unit 11 for integrally controlling operations of the hand portion 2 and the slide type joint portion 8. Notation OBJ designates an object to be manipulated.

FIGS. 2A and 2B show a structure of the fingertip portion 5. FIG. 2A is a sectional view of a side face of the fingertip portion 5 (view from a direction the same as that of the fingertip portion 5 of FIG. 1) and FIG. 2B is a view of a barrel face of the fingertip portion 5 which is a face at which the finger and the object are brought into contact with each other. FIG. 2A is a sectional view taken along a tangential line AA' of FIG. 2B. A frame 21 of the fingertip portion 5 is provided with the optical slip sensor module 9 and the contact sensor module 10. Notation 22 designates an LSI chip for processing and communicating information provided from the sensors (9 and 10). Notation 23 designates signal lines for connecting the sensors and the LSI chip 22. Notation 24 designates a board for mounting the LSI chip 22. Notation 25 designates a relay circuit for connecting plural contact sensors CSG's to the LSI chip 22. The frame 21 is provided with a hole 27 for the optical slip sensor module 9. The LSI chip 22 subjects the information from the plural sensors mounted on the finger to signal processing, such as digitization and noise removal, and transmits the processed information to the control unit 11 via a set of signal lines. The influence of noise in the wiring to the control unit and a processing amount of the control unit can be reduced by performing the digitization and other signal processing within the finger portion in the vicinity of the sensors.

The optical slip sensor module 9 includes a light emitting element 28, an optical guide element 29 for irradiating an object with light from the light emitting element via the hole 27, an image sensor 30, and a lens 31 for focusing light from the hole 27 to a sensor portion of the image sensor 30. The optical slip sensor module 9 irradiates a surface of an object to be manipulated with the light from the light emitting element 28, acquires an image of the surface of the object irradiated with the light, and calculates a change in a position of the target object relative to the slip sensor module based on a change of the image over time. In the drawing, the slip sensor module 9 can detect the slip of the object in contact with the portion of the hole 27. A position at which the slip can be detected is the slip detection point SPT, and slip cannot be detected at other positions.

As shown in FIG. 2B, the contact sensor module 10 is provided at the barrel face of the finger of the manipulator, and plural contact sensors CSG's are distributed along the contact sensor module 10. In the present embodiment, contact sensors CSG (−0) and CSG (+0) are proximal to the detection point SPT of the slip sensor, while the other contact sensors (CSG (−3), CSG (−2), CSG (−1), CSG (1), CSG (2)) are arranged to widely cover the barrel face of the finger, which is a feature of the arrangement.

The contact sensors CSG (−0) and CSG (+0) are arranged such that the detection point of the slip sensor is disposed on a linear line connecting these, which is also a feature of the arrangement. It can be determined by the contact sensors CSG (−0) and CSG (+0) that the object and the finger portion are brought into contact with each other on both sides of the slip detection point. Thereby, the probability of a state in which only a portion of the finger portion is brought into contact with the object can be reduced.

According to the present application, the position of the object to be manipulated is detected by using the contact sensors, and the position of the object to be manipulated and the slip detection point SPT are controlled to coincide with each other. When the contact sensors are used, it can be determined that the manipulator position is controlled to effectively operate the slip sensor in a case where both of the contact sensors CSG (−0) and CSG (+0) detect contact with the object to be manipulated, and it is determined that the position of the manipulator needs to be adjusted where one or both of the contact sensors CSG (−0) and CSG (+0) do not detect the contact. In FIGS. 2A and 2B, a distance between the contact sensors CSG (−0) and CSG (+0) is designated by notation DSA, and distances between adjacent pairs of the contact sensors CSG are designated by notation DSB, which is the same for each pair.

FIGS. 3A and 3B show an outline of a finger portion adjusting control using the contact sensor CSG described above. A structure of the fingertip portion 5 of the drawings is the same as the structure shown in FIGS. 2A and 2B. FIG. 3A shows a state before adjusting the position of the finger, and FIG. 3B shows a state after adjusting the position of the finger as described herein.

In FIG. 3A, before adjusting the position of the finger, a point at which the object OBJ to be manipulated and the fingertip portion 5 are brought into contact with each other is spaced from the slide sensor detection point SPT such that slip cannot be evaluated. The example illustrated is a case where only CSG (−3) of the contact sensors detects the contact. The control unit recognizes that the position of the manipulator is not correct since the contact sensors CSG (−0) and CSG (+0) do not detect the contact. The control unit therefore calculates an adjustment amount for the position of the manipulator since the contact sensor CSG (−3) detects the contact. In this case, the position of the hand portion is adjusted by a distance of (DSB×3+DSA) in −X axis direction.

FIG. 3B shows a state after adjusting the position. As a result, the position of the object to be manipulated and the slide sensor detection point coincide with each other, which is a state where the slip can correctly be detected. In this configuration, the contact sensors CSG (−0) and CSG (+0) detect the contact, and it can be recognized that the control unit can correctly adjust the position.

The structure of the manipulator of FIGS. 3A and 3B is similar to that of FIG. 1. One of features of the manipulator resides in having a mechanism that slides the hand portion 2 in the X direction in order to simply adjust the position of the hand portion 2 in the X direction (forward direction MVR and backward direction MVL relative to the arm portion). A portion of the joint portion 8 can act as a slider, and a distance between the revolute joint portion 6c and the revolute joint portion 7a can be changed. The position of the hand portion 2 in the X direction can thus be changed by controlling a single actuator (motor or the like) by such a mechanism without moving the plural revolute joints of the arm portion 1, and the hand position can be adjusted with a swift response speed.

The control unit 11 carries out the processing necessary for controlling adjustment of the finger position described above.

Figure 4:
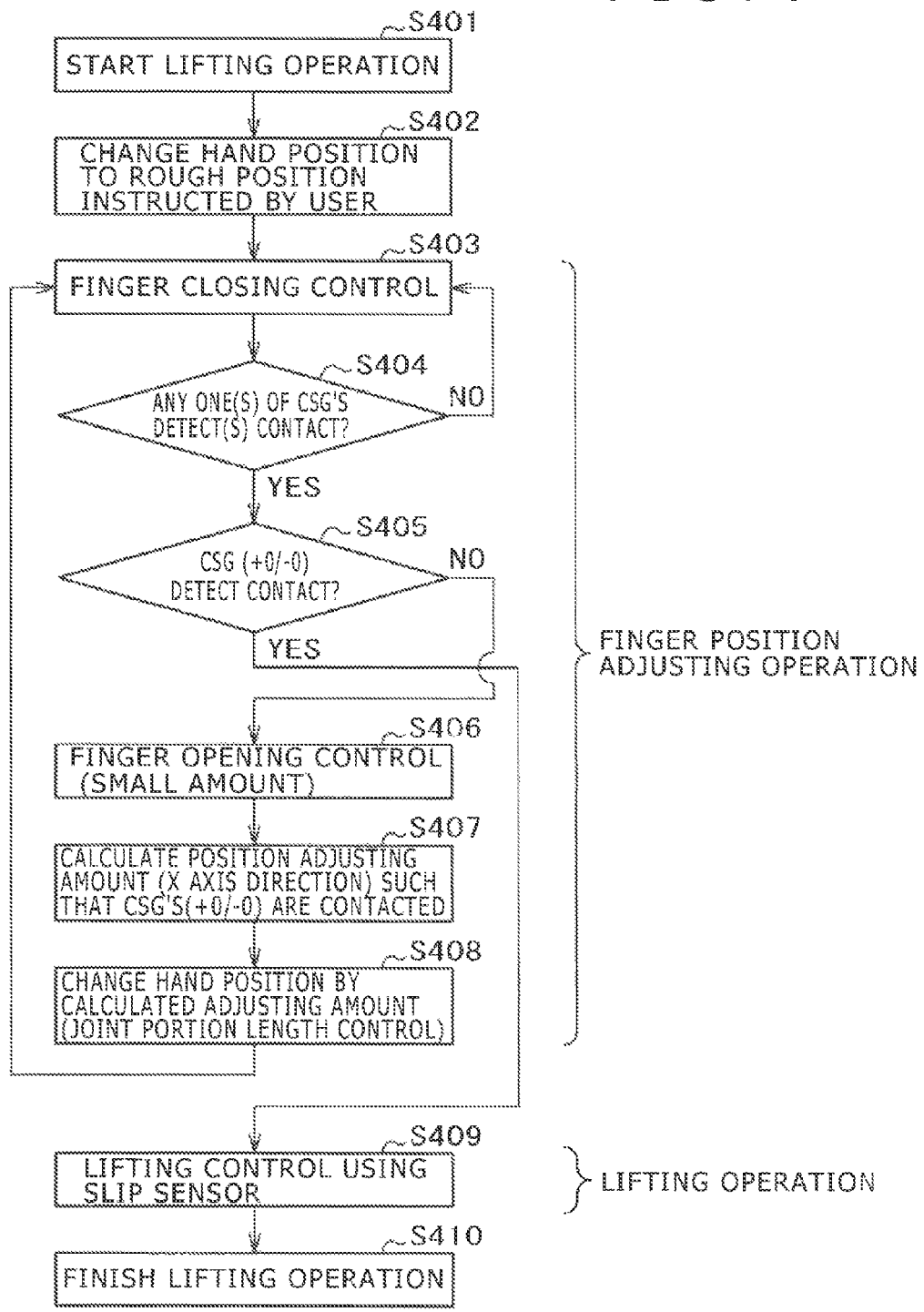
FIG. 4 is a diagram showing a finger position adjusting procedure according to the first embodiment of the present invention.

FIG. 4 shows a finger position adjusting procedure of a manipulator when an object is grasped for lifting. The example relates to a manipulator of a semiautomatic control type in which a user instructs rough position and shape of the manipulator, and the manipulator automatically adjusts fine position and force.

When a lifting operation is started (S401), first, a user instructs rough positions and shapes of a manipulator and a hand thereof. The manipulator changes the position and shape in accordance with the instruction (S402).

Next, the manipulator performs a finger position adjusting operation for adjusting a position of a finger such that a position of an object to be manipulated coincides with a slip detection point. In the procedure of the finger position adjusting operation, first, an operation of closing the hand is carried out such that the finger is brought into contact with the object in order to grasp the object (S403). The contact of the object to the finger is detected by using the contact sensor(s) CSG('s), and the operation of closing the hand is stopped at a time point at which one or more of CSG('s) detects the contact (there is a possibility that a number of remaining CSG('s) detect the contact when the hand closing operation is stopped by closing the hand to some degree after a contact detecting time point) (S404). After stopping the hand closing operation, a control unit confirms whether the contact sensors CSG (−0) and CSG (+0) detect the contact (S405). In a case where these detect the contact, it is determined that the position of the hand is acceptable, and the procedure proceeds to the lifting operation (S409). In a case where either one or both of the contact sensors CSG (−0) and CSG (+0) does (do) not detect the contact, an operation of opening the hand by a small amount is performed (S406). Thereafter, a hand position adjusting amount is calculated such that the slip detection point coincides with the position of the manipulating object (S407). The hand position adjusting amount is calculated from a difference(s) between a position(s) of the contact sensor(s) CSG('s) which detect(s) the contact, and positions of CSG (+0) and CSG (−0). Next, the hand position is changed by the calculated adjusting amount by using the hand position adjusting mechanism shown in FIG. 3 (S408). After the adjustment, the hand closing operation is performed once more (S403). The slip detection point coincides with the position of the operating object since the hand position is adjusted. After confirming that the contact sensors CSG (−0) and CSG (+0) detect contact (S405), the procedure proceeds to a lifting operation (S409) and then terminates after lifting (S410).

Figure 5:
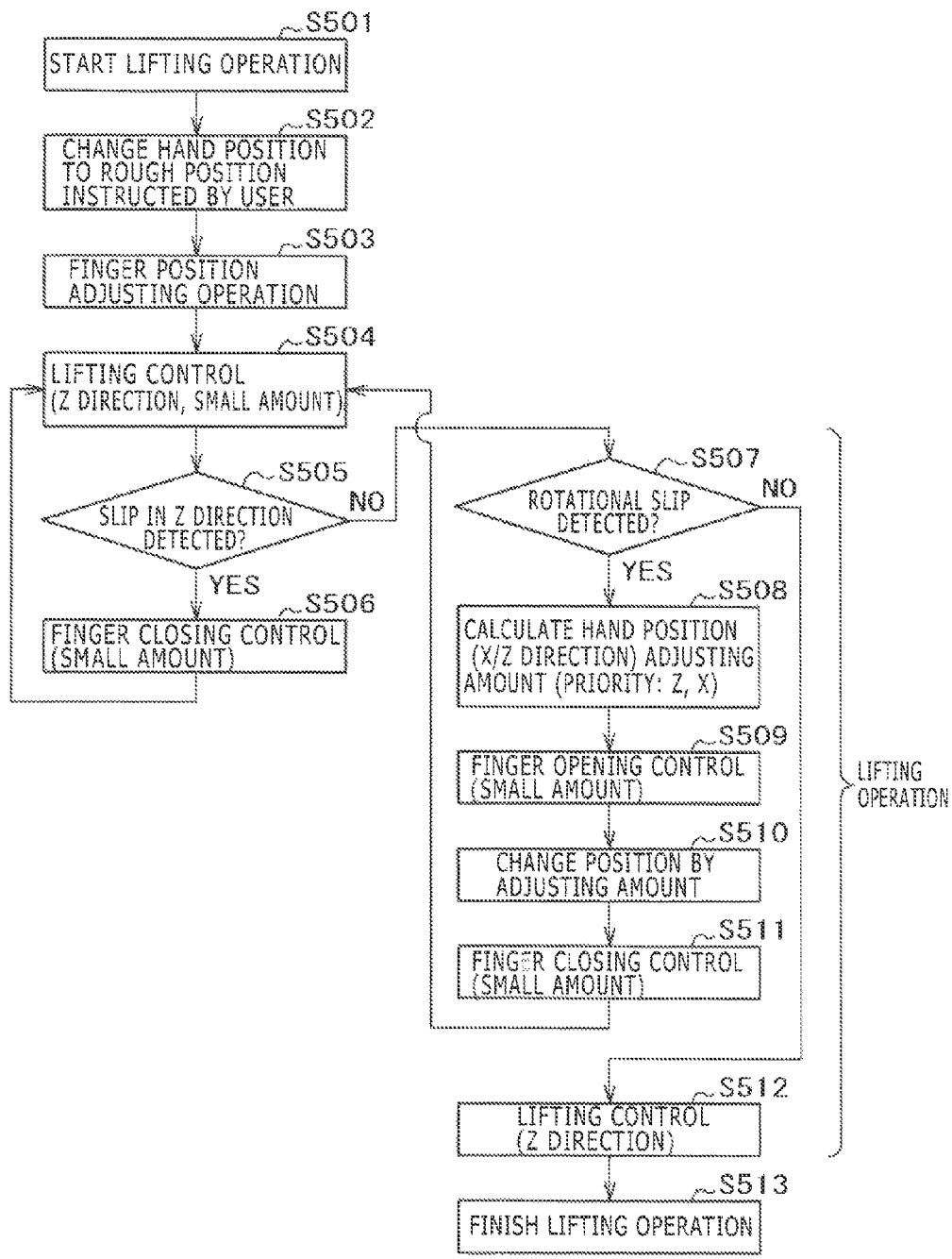
FIG. 5 is a diagram showing an object lifting procedure according to the first embodiment of the present invention.

FIG. 5 shows a control procedure when an object is lifted after the finger position adjusting operation mainly shown in FIG. 4. In the lifting operation, a grasping power of the hand is adjusted to an acceptable force that is not excessively strong while avoiding slippage of the object by using the slip sensor. According to the present example, a description will be given of a case of lifting the object in a positive direction of the Z axis.

In the lifting operation, the hand portion is moved by a previously determined small amount in the Z direction of FIG. 1, FIG. 2, and FIG. 3 (S504), and a slip amount which is detected by the slip sensor 9 at that time is acquired (S505). In a case where the slip sensor detects the slip in the Z axis direction, the shape of the hand portion is changed by a previously determined amount in a finger closing direction (S506), and the operation is repeated until there is no slip in the Z axis direction (hand portion shape adjusting).

There is also a case where there is no unidirectional slip in the Z direction, but there is a rotational slip. When the slip sensor detects the rotational slip (S507), the position of the hand portion is changed by a previously determined amount in the positive direction of Z axis (S508). A shape of the hand portion is changed in the finger opening direction (S509) before changing a position of the hand portion by the adjusting amount (S510). The shape of the hand portion is then changed in the finger closing direction (S511). Thus, a further upper portion of the object is grasped, and the rotation can be restrained. However, in a case where the detection point of the slip sensor is shifted from the object to be manipulated, the position in the Z direction is returned to an original position. Also, in a case where the rotation cannot be eliminated even by the adjustment in the Z axis direction, the position of the hand portion is changed by a previously determined amount in the X axis direction (S510). In a case where positions in the Z axis and the X axis are adjusted, the hand portion shape adjustment described above is performed once more.

In a case where the slip can be avoided by the adjustments, the lifting operation is performed (S512) and then terminates after lifting (S513). In a case where the slip is detected even after having finished the adjustments, the user is notified.

When objects of various sizes or shapes are operated in the living space, the possible lack of good contact of the objects with the slip detection point can pose a problem. However, the problem can be resolved by using the present invention. In addition, means for mounting a plurality of slip sensor modules are also possible. However, each optical slip sensor module includes multiple parts (e.g., a light source, a lens, a sensor and so on) and therefore, it is difficult to downsize the module to allow mounting a number of the parts to a volume of about the human finger.

Second Embodiment

The first embodiment shows an embodiment of mounting the slip sensor and the contact sensor to the fingertip portion 5. It is also effective to mount a sensor which detects a force in addition to the sensors. For example, when force sensors in multiple axes/directions (three axes, six axes or the like) are provided at the finger portion, the manipulator can recognize a force exerted by an object and an actuator driving the manipulator can be controlled more accurately. In a case of a manipulating-type manipulator, which a person can manipulate in real time, a force exerted to the manipulator can be fed back to an operator.

Figure 6:
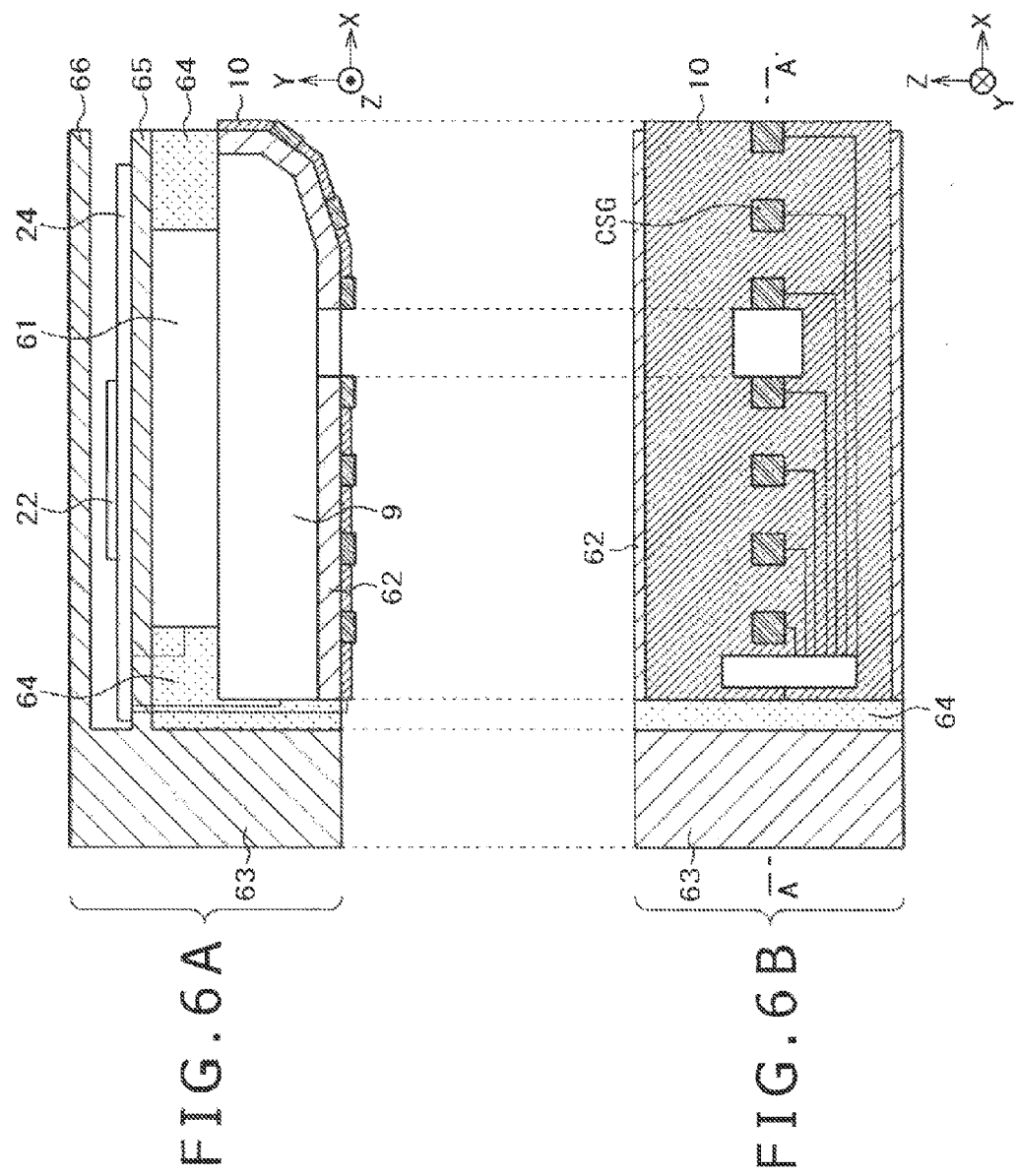
FIGS. 6A and 6B are views showing a configuration of a fingertip end portion according to a second embodiment of the present invention.

FIGS. 6A and 6B show a configuration with a force sensor mounted to the same fingertip portion. In a case of three axes, a force sensor 61 can detect forces in three directions of the XYZ axes illustrated in the drawings. For example, the force sensor can be a strain gage, an optical force sensor using a light emitting element and a position detector, a piezoelectric element or any other force sensor. The force sensor 61 according to this embodiment detects multiaxial forces in multiple gradations, whereas the contact sensor CSG in the present embodiment is a sensor which detects whether the sensor is brought into contact with an object (one axis (Y direction in this example), a gradation thereof may be a low gradation of 1 bit or the like).

It is difficult to mount both of the optical slip sensor and the multiaxial force sensor on a surface of a narrow fingertip portion. The reason is that although it is necessary for the optical slip sensor to maintain a distance to a target object at a constant short distance (for example, an error equal to or less than 1 mm), generally, a deformation of a detecting portion is needed in the force sensor—a deformed portion of a volume to some degree is needed in order to ensure a dynamic range. There is needed a system of mounting both sensors while accommodating the contradictory requirements of the optical sensor, which does not allow deformation, and the force sensor, which needs deformation in a narrow area of the finger.

Therefore, according to the present embodiment, as shown in FIGS. 6A and 6B, the optical slip sensor 9 is mounted to a frame 62 of the finger barrel face, and the multiaxial force sensor 61 is arranged on a finger back face side of the slip sensor 9. A frame of the fingertip portion comprises the frame 62 of the finger barrel face and a frame 63 which becomes a base. The frame 63 which becomes the base is connected to the revolute joint (7b or 7c in FIG. 1) on a root side of the finger. The frame 62 of the finger barrel face can move relative to the frame 63 which becomes the base The force sensor is fixed to the frame 63 which becomes the base. The slip sensor 9 and the contact sensor 10 are fixed to the frame 62 of the finger barrel face. When a force is exerted to the barrel face of the fingertip portion in manipulating an object, the fingertip barrel portion including the frame 62 of the finger barrel face, the contact sensor 10, and the slip sensor 9 is displaced relative to a fingertip base portion including the frame 63 which becomes the base and the force sensor 61. At this time, the force is exerted to the force sensor in contact with the fingertip barrel portion, and the force sensor detects the force.

A portion of notation 64 of the drawing designates a substance (rubber or the like) having a softness by which a deformation of the fingertip barrel portion relative to the finger tip face portion is prevented. As shown in FIG. 6A, a section of the frame 63 which becomes the base is configured by a comb-shaped structure. A comb portion 65 is a portion for fixing the force sensor, and a comb portion 66 is a portion for protecting the LSI chip 22 and the board 24.

Although the explanation has been given of the multiaxial force sensor according to the embodiment, even a uniaxial force sensor can be used, although the amount of information acquired is reduced.

Both of the optical slip sensor, which is sensitive to a measuring distance and in which a deformation amount is restricted, and the force sensor, which needs deformation, can be mounted to the fingertip portion by the mounting operation shown in the present embodiment. The volume of the sensor can be enlarged and a dynamic range of the sensor can be widened by mounting the force sensor but at an inner portion of the finger instead of at a surface of the finger. A second effect is that the softness of the finger is enhanced since the fingertip barrel portion is configured by a structure movable relative to the base portion.

Third Embodiment

Figure 7:
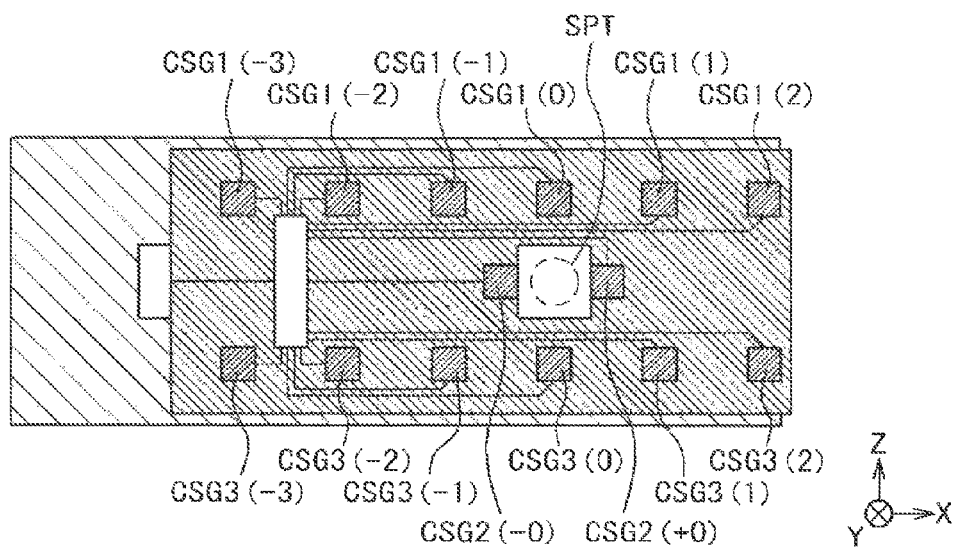
FIG. 7 is a view showing a configuration of a fingertip end portion according to a third embodiment of the present invention.

FIG. 7 shows a mode in which an arrangement of the contact sensors CSG of the fingertip portion 5 differs from that of the first embodiment. The drawing corresponds to FIG. 2B in the first embodiment. According to the present embodiment, plural rows of contact sensors are mounted in the Z direction (direction orthogonal to a front and rear direction of the finger tip portion at the finger barrel face).

According to the example, it is determined that the slip detection point SPT is brought into contact with an object in a case where both of contact sensors CSG 2 (−0) and CSG 2 (+0) detect the contact. For example, in a case only CSG 1 (2) detects the contact, the finger position is adjusted in a negative direction of the Z axis and a negative direction of the X axis such that both of CSG 2 (−0) and CSG 2 (+0) detect the contact.

According to the present embodiment, the ability to manipulate an object having a small flat portion relative to the Z axis direction is improved, and the finger position can be adjusted more finely.

Fourth Embodiment

Figure 8A:
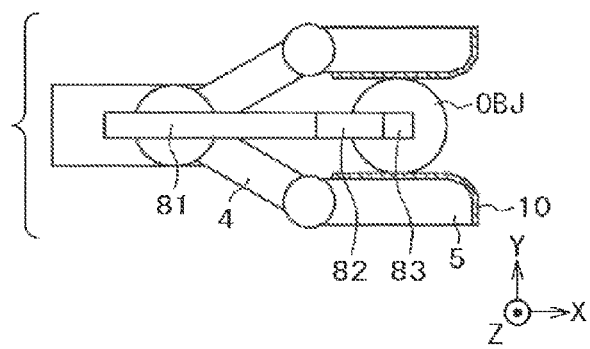
FIGS. 8A, 8B, and 8C are views showing a configuration for slip detection according to a fourth embodiment of the present invention.
Figure 8B:
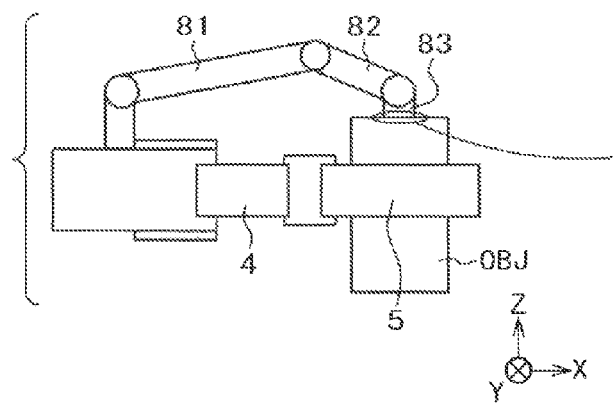
Figure 8C:
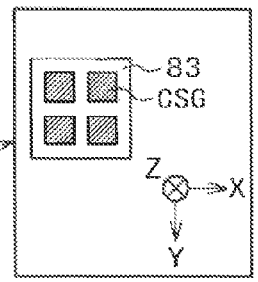

FIGS. 8A, 8B, and 8C show a mode of detecting slip by a system different from those of the first embodiment, the second embodiment, and the third embodiment. FIG. 8A is a view showing a state in lifting an object from an upper direction, and FIG. 8B is a view showing the state from a horizontal direction.

The mode has exclusive slip detecting tentacles 81, 82, and 83 which detect slip for the manipulator shown in FIG. 1. A lower face (manipulating object contact face) of the slip detecting tentacle 83 is mounted with a contact sensor CSG (FIG. 8C).

Next, a procedure in lifting an object will be shown. A shape of the slip detecting tentacles is controlled to be brought into contact with an upper face of the object OBJ to be manipulated, and positions of the slip detecting tentacles are fixed at the contact position. At this time, the contact sensor of the slip detecting tentacle 83 is brought into a state of detecting the contact.

Thereafter, an operation of lifting the object is performed. In a case where the object cannot be well lifted and slip is brought about, the slip detecting tentacle 83 separates from the object, the contact sensor CSG of the slip detecting tentacle does not detect the contact, and the manipulator can detect that the object has slipped.

Conversely, in a case where the slip is not brought about, and the object can be lifted well, the slip detecting tentacle 83 does not separate from the object, and the contact sensor CSG of the slip detecting tentacle continues to detect the contact. Thereby, manipulator can detect that the object has not slipped.

The system achieves an advantage that the slip can be detected only by the contact sensor, and an advantage that in a case of an object having an upper face that can be touched by the contact sensor, it is not necessary to adjust the finger position.

Although the first embodiment, the second embodiment, the third embodiment, and the fourth embodiment show contents of the present invention by taking an example of the manipulator as described above, the contents are applicable to all machines that manipulate an object, and are not to be narrowly limited to a manipulator having a shape similar to the human hand. Although the description has been given by taking an example of an optical slip sensor in the first embodiment, the second embodiment, and the third embodiment, the slip sensor is not necessarily limited to the optical type, but the slip sensor detecting the contact state shown in the fourth embodiment or a sensor utilizing a piezoelectric element can also be used.

When the slip sensor is used, a process of grasping an object by applying a sufficient force to a degree that slipping of the object does not occur can be carried out, and various objects, weights, coefficients of friction, and shapes that are indeterminate can be grasped. The slip detection is effective also for tracing the surface of the object using the fingertip of the manipulator.

When the present invention is used, the object can be manipulated at the slip detection point. Although when objects of various sizes or shapes are manipulated in the living space, even though failure to bring the objects into acceptable contact with the slip detection point can pose a problem, the problem can be resolved.

What is claimed is:

1. A manipulator device comprising:
    an arm portion;
    a hand portion including at least one finger portion for manipulating a target object, the at least one finger portion including:
        a slip sensor;
        at least one first contact sensor arranged at a position proximate to the slip sensor; and
        at least one second contact sensor arranged at a position remote from the slip sensor; and
    a control unit configured to control the hand portion based on signals from the first and second contact sensors such that when the at least one second contact sensor detects contact with the target object and the at least one first contact sensor does not detect contact with the target object, a position of the at least one finger portion is moved by a distance corresponding to a distance between the at least one first contact sensor and the at least one second contact sensor so as to make a detecting position of the slip sensor coincident with a position of the target object.

2. The manipulator device according to claim 1, wherein the control unit is configured to increase a grasping force applied to the target object by the at least one finger portion when a slip is detected by the slip sensor in a case where the target object is grasped by the at least one finger portion for lifting.

3. The manipulator device according to claim 2, wherein the control unit is configured to change a position for grasping the target object by the at least one finger portion when a rotational slip is detected by the slip sensor in a case where the target object is grasped by the at least one finger portion for lifting.

4. The manipulator device according to claim 1, further comprising:
a sliding mechanism that moves the hand portion in a forward or backward direction relative to the arm portion.

5. The manipulator device according to claim 1, wherein the slip sensor is an optical slip sensor including a light emitting element and an image sensor.

6. The manipulator device according to claim 1, wherein each first contact sensor is arranged such that the detection position of the slip sensor is disposed on a linear line connecting two of the first contact sensors.

7. The manipulator device according to claim 1, wherein the at least one finger portion further includes:
a force sensor,
wherein a frame of the at least one finger portion is formed by a structure comprising a base frame portion and a finger barrel frame portion, which can move relative to each other,
the slip sensor and the first and second contact sensors are mounted to one of the base frame portion and the finger barrel frame portion, and
the force sensor is mounted to the other of the base frame portion and the finger barrel frame portion.

8. The manipulator device according to claim 7,
wherein the slip sensor and the first and second contact sensors are attached to the finger barrel frame portion so as to be able to detect information regarding an object contact face,
the force sensor is attached to the base frame portion, and
the force sensor is arranged between the base frame portion and the finger barrel frame portion so as to detect a force exerted therebetween.

9. The manipulator device according to claim 7, wherein the force sensor is a multiaxial force sensor.

10. The manipulator device according to claim 1, further comprising a plurality of third contact sensors arranged in a row offset in a direction orthogonal to a fingertip direction from a row containing the first and second sensors.

* * * * *